Aug. 25, 1953　　　　K. REICH ET AL　　　　2,649,873
ELECTRICALLY DRIVEN HAND PLANING MACHINE
Filed Aug. 3, 1949　　　　　　　　　　　　　5 Sheets-Sheet 1

INVENTORS
**KURT REICH
GUSTAV WALLISER**

BY *Young, Emery & Thompson*
ATTORNEYS

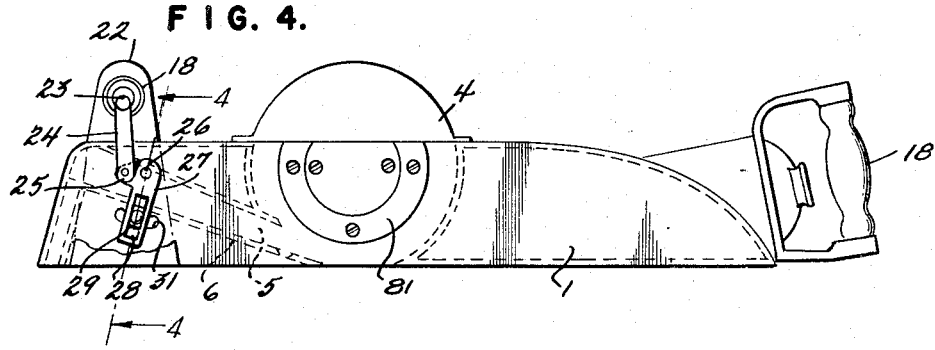
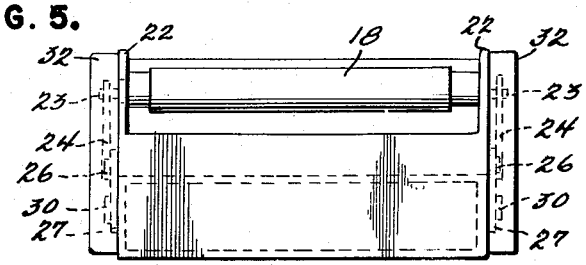
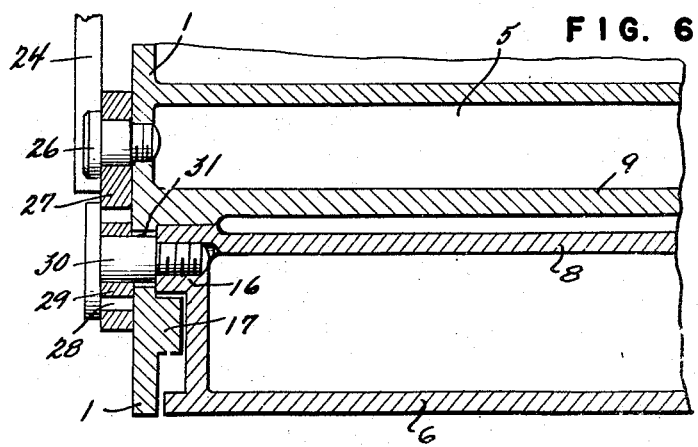

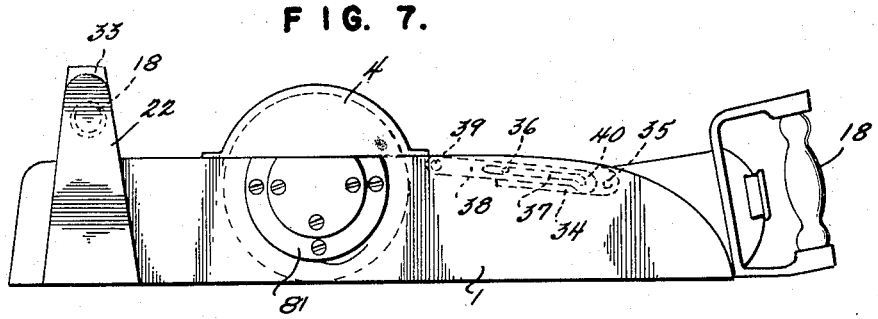
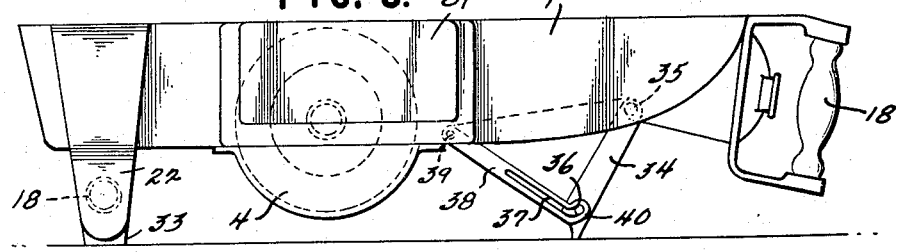
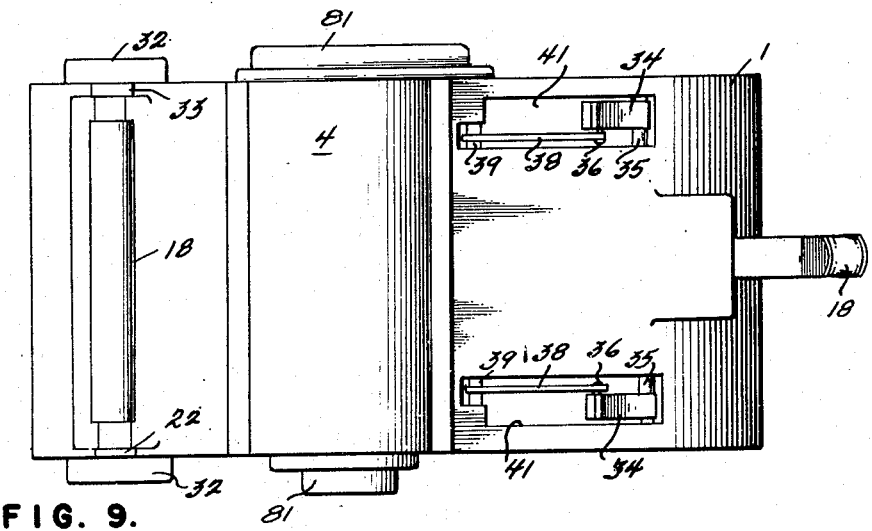

Aug. 25, 1953  K. REICH ET AL  2,649,873
ELECTRICALLY DRIVEN HAND PLANING MACHINE
Filed Aug. 3, 1949  5 Sheets-Sheet 4

INVENTORS
**KURT REICH
GUSTAV WALLISER**
BY
ATTORNEYS

INVENTORS
**KURT REICH
GUSTAV WALLISER**

BY
ATTORNEYS

UNITED STATES PATENT OFFICE 2,649,873

ELECTRICALLY DRIVEN HAND PLANING MACHINE

Kurt Reich, Nurtingen-Zizishausen, and Gustav Walliser, Reutlingen-Betzingen, Germany, assignors to Firma Karl M. Reich, Nurtingen, Wurttemberg, Germany Application August 3, 1949, Serial No. 108,394
In Germany October 1, 1948

10 Claims. (Cl. 144—117)

The invention relates to an electrically driven planing machine which can be used as a hand planing machine, as stationary planing machine, and as a trueing and thicknessing planing machine.

With the known hand planing machines, the driving motor and the cutter shaft are arranged in a common frame at a distance from each other and the transmission of motion from the motor to the cutter shaft takes place by means of wedge belts or spur-wheels. Such a construction is expensive and makes the machine inconvenient to use. On the other hand, the hand planing machine according to the invention is distinguished by the drive of the planing shaft taking place through an external rotor motor. Furthermore, the frame taking the external rotor motor of the planing machine consists of one piece.

The electrically driven hand planing machine according to the invention is convenient, owing to the use of the external rotor motor and by the frame consisting of one piece, and it can be produced comparatively cheaply.

The slide provided with such a hand planing machine for adjusting the thickness of shaving is, according to the invention made wedge shaped. Of the two wedge surfaces one serves as a supporting surface for the planing machine and the other is carried on a correspondingly inclined guide surface of the frame.

Furthermore, according to the invention the handle arranged in the vicinity of the slide for adjusting the thickness of shaving is made as part of the device for adjusting the slide. The adjustment of the slide could in itself also take place by means of a threaded spindle carried in the frame of the machine and provided with a small handwheel, which spindle would engage in a nut of the slide. This method of adjusting the slide is, however, inconvenient in that the operator of the hand planing machine who holds the machine with both hands, must release one of the two handles in order to operate the handwheel. This drawback is obviated by the construction according to the invention. The operator can thus, in order to adjust the thickness of shaving, use the correspondingly designed handle arranged in the vicinity of the slide and does not need to release this handle at all. This construction of the hand planing machine has, furthermore, the advantage that the operator can put on one side the hand planing machine with the motor running, since as long as he has the handle gripped in the hand, he adjusts the slide so that the shaft of the plane does not come into contact with the support on which the hand planing machine is arranged.

In order that the hand planing machine can be used optionally also as a stationary trueing machine, the supports of the handle arranged at one end of the housing are made as feet and there is provided at the other end of the machine a supporting device adapted to be folded away from the housing or casing.

The invention relates furthermore to the conversion of the electrically driven hand planing machine into a trueing and thicknessing planing machine. This is characterised by the detachable connection of the portable electrically driven hand planing machine with a stationary frame in such manner that the supporting surface used in the non-stationary use of the machine comes upward and serves as table for the trueing device and by the knife shaft freed from the cover and projecting on the opposite side of the hand planing machine coming opposite inside the frame to a table adjustable in level on which the work trued on one side can be carried for machining to thickness.

In the frame there are arranged in front and behind the knife shaft spring-carried rollers as feed roller and pressure roller which are driven through gearing arranged in the frame, by the motor of the portable hand planing machine placed thereon.

With stationary machines the arrangement is known per se that a knife shaft is so fitted into the frame that trueing can take place on the table of the frame and the same knife shaft is used to machine to thickness a work piece already trued on one side, carried over a second table arranged and adapted to be raised and lowered in the frame of the main table.

As compared with this the conversion of the electrically driven hand planing machine according to the invention into a trueing and thicknessing planing machine differs in that a portable electrically driven hand planing machine and a frame enlarging this machine into a trueing and thicknessing planing machine can be optionally connected together so that the machine can be used alone as a hand planing machine, whilst on the other hand however only additional parts are necessary when it is desired to operate as a trueing and thicknessing machine.

The objects of the invention are shown by way of example on the annexed drawing, in which:

Figure 4 is a side view of the hand planing machine provided with the special adjusting device for the slide varying the thickness of shaving;

Figure 5 is an end view of the hand planing machine according to Figure 4;

Figure 6 shows on an enlarged scale a section through the machine taken on line 4—4 of Figure 4 in the plane corresponding to the principal axis of the slotted limb of the angle lever of the adjusting device;

Figure 7 shows the hand planing machine with the additional device for the use thereof as stationary trueing machine, but in the position in which it would be used as portable planing machine;

Figure 8 shows the same machine in the position when used as stationary trueing machine;

Figure 9 is a plan of the machine according to Figure 7;

Figure 1:
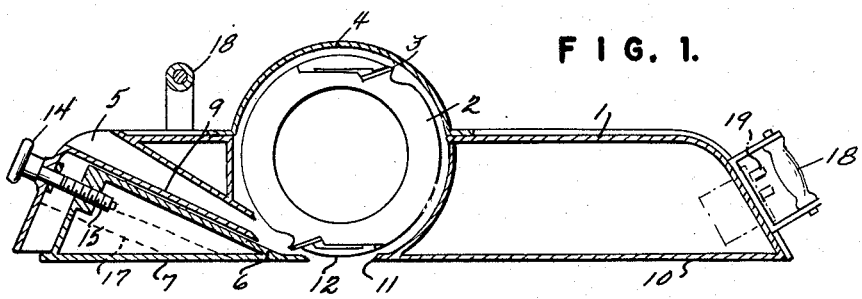
Figure 1 shows a longitudinal section through the planing machine.
Figure 2:
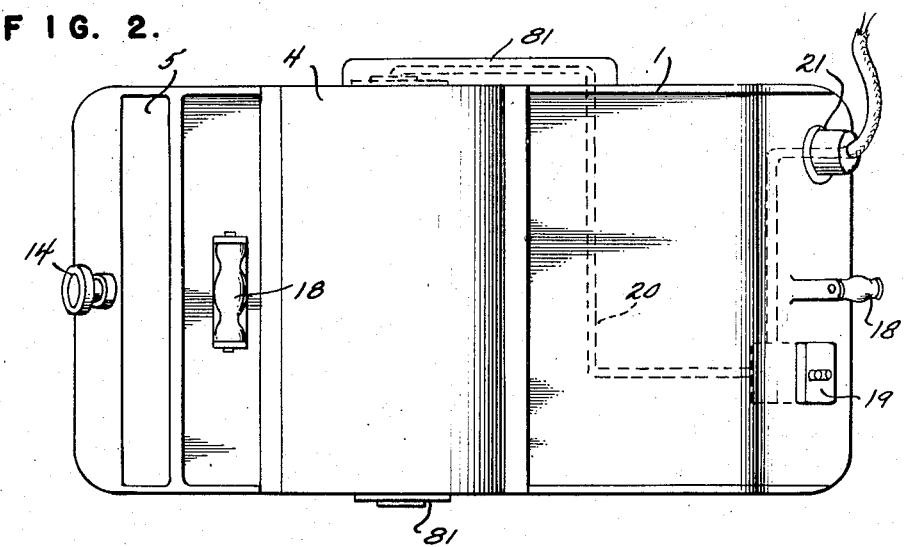
Figure 2 is a plan of the planing machine.

The planing machine consists of the extended flat frame 1 which consists of one piece, preferably cast in one piece. By this construction of the frame 1 the machine becomes extremely handy and can be made comparatively cheaply. The frame can in this way assume an extended low shape from the surface of which there only projects the cover 4 surrounding the motor. Furthermore, owing to this construction of the frame 1, further advantages arise which will appear from the following.

The external rotor motor 2 which carries the knives 3 on its periphery is supported in the frame 1. The frame 1 is open on its surface at the point where the motor 2 is fitted, and the motor 2 is covered with a cover 4. Side covers 81 are provided.

Viewed in the direction of movement of the machine, there is provided in front of the motor 2 a shavings discharge conduit 5, the walls of which consist in one piece with the frame 1 and which is arranged obliquely. Thus, all fastening means necessary for a separately fitted shaving discharge conduit are dispensed with. The gap-like opening of the shaving discharge conduit 5 on the surface of the frame 1 is kept so narrow as not to be sufficient for the passage of a hand. In this way, accidents caused by want of foresight are obviated.

The slide 6 for adjusting the thickness of shaving is wedge-shaped. The one wedge surface 7 serves as supporting surface for the planing machine, and the other wedge surface 8 is carried on the bottom 9 of the obliquely running shaving discharge conduit 5. With known planing machines, the slide for adjusting the thickness of the shaving is carried in the perpendicular direction to the supporting surface and planing machine. This results in the gap 12 on the underside of the planing machine, through which the planing knives 3 protrude, having to be made very wide, since the slide movable perpendicularly to the supporting surface cannot be designed in such manner that it extends close to the cutting position. The wedge-shaped slide according to the invention can be carried comparatively close to the cutting surface, so that with a small thickness of shaving there is a very narrow gap 12 for the plane knife 3. This circumstance is particularly important when the electrically driven hand planing machine is to be used standing on its head as a stationary machine.

Apart from additional safety devices, efforts must be made for reasons of safety to keep the gap 12 referred to as narrow as possible.

Figure 3:
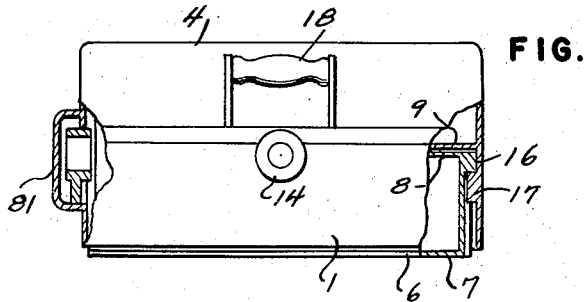
Figure 3 is a partial sectional view of the end elevation of the planing machine.
Figure 10:
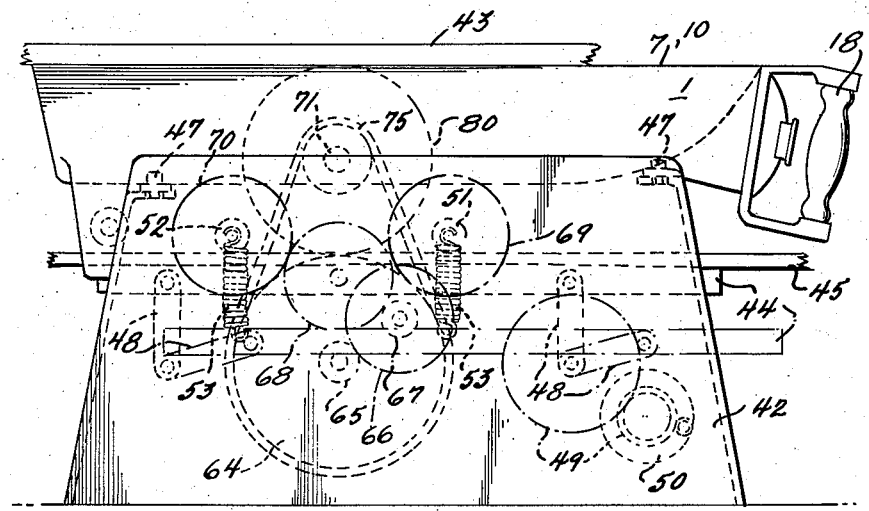
Figure 10 is a view of the hand planing machine used as trueing and thicknessing planing machine.
Figure 11:
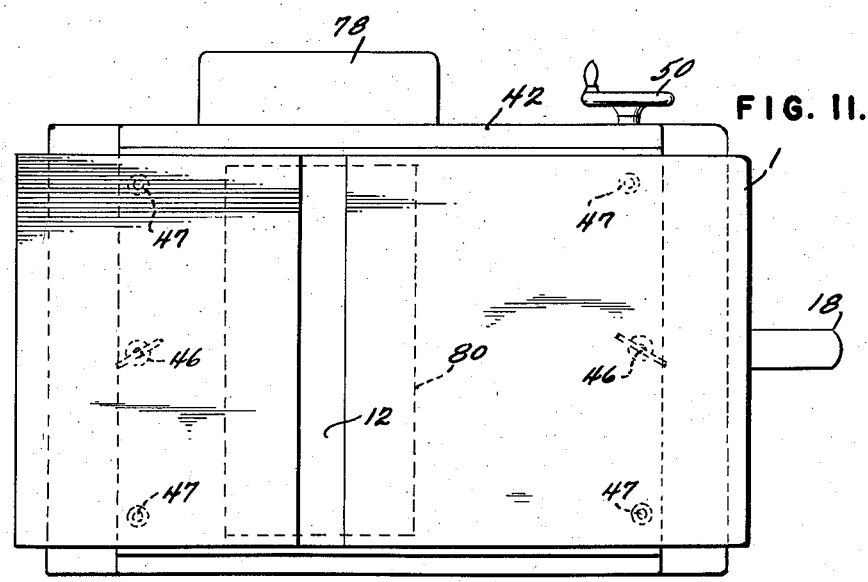
Figure 11 is a plan of the machine.
Figure 12:
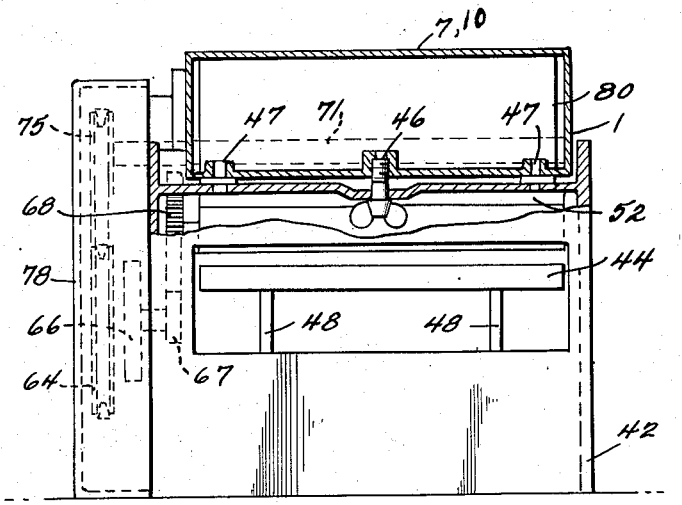
Figure 12 is a partial cross-section end view of the machine.
Figure 13:
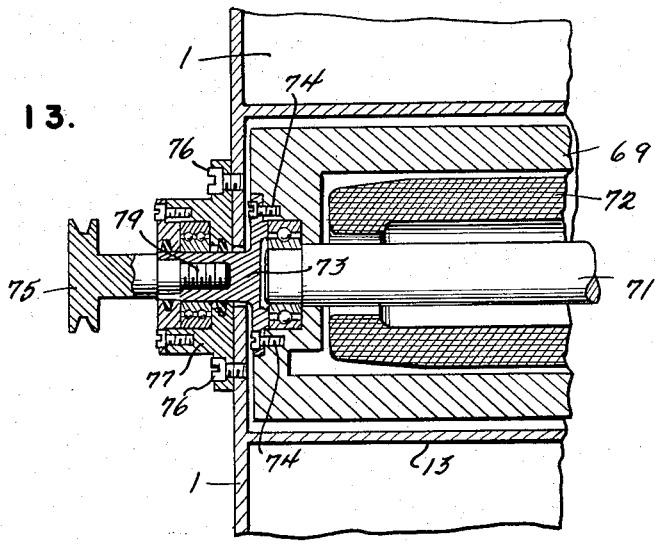
Figure 13 shows on an enlarged scale the connection of the motor rotor on to the roller drive.

The adjustment of the slide 6 can take place by means of a threaded spindle 15 fitted in the frame 1 and provided with a small handwheel 14 which spindle engages in an internal thread of the slide 6. The slide 6 is carried on the side walls of the frame 1 by means of strips 16 which slide on strips 17 consisting also of one piece with the frame 1 (Figure 3).

The shavings discharge conduit 5 and the slide 6 for adjusting the thickness of the shaving, viewed in the direction of movement of the machine, are arranged in front of the motor 2 in the frame 1, whilst the part of the frame 1 situated behind the motor 2 together with the closing plate 10 provided on its underside, serves essentially only as leverage for manipulating the machine and as support for it. The closing plate 10 is carried as close to the cutting position as the passage of the knives 3 allows. Between its edge 11 directed towards the cutting position and the tip of the slide 6, the gap 12 for the passage of the knives 3 is open and by the wedge-shaped construction of the slide 6 it can be kept very small with the planing machine according to the invention.

The external rotor motor 2 is separated from the rear part of the frame 1 by a partition 13. The rear part of the frame 1 is comparatively long. The somewhat long leverage so produced facilitates the manipulation of the machine and particularly so with respect to counterbalancing.

On both the front part and on the rear part of the frame 1 there is arranged a handle 18 which handles, in known manner, are arranged at right angles to each other and in this way permit a convenient manipulation of the planing machine. Close to the rear handle 18 there is provided the switch 19 from which the current supply conductors 20 are carried to the stationary plane shaft of the stator of the external rotor motor 2. There is also provided a plug socket 21 at the rear part of the frame 1.

In Figures 4 to 6 there is shown a further development of the electrically driven hand planing machine. It has the further advantage that the operator or attendant who holds the machine with both hands has not to release one of the two handles 18 in order to actuate the handwheel 14 provided for the adjustment of the shaving thicknessing slide 6. According to the invention, the handle 18 of the hand planing machine arranged in the vicinity of the slide 6 is made as part of the device for the adjustment of the slide 6. The attendant, therefore, in order to adjust the thickness of shaving, can operate the handle 18, suitably designed, and arranged in the vicinity of the slide 6 and does not need to release this handle 18 at all.

In detail, the arrangement is so contrived that the handle 18 is made as an eccentric, the rotary movements of which, converted into direct movements are transmitted to the slide 6. For this purpose, the handle is rotatably carried in supports 22 rigidly attached to the frame 1. At its two ends the spindle of the handle is provided with eccentric pins or pivots 23. Each of these eccentric pivots 23 is coupled by means of a link piece 24 with the one limb 25 of a double-armed lever carried at 26 on the housing 1, the other limb 27 of which lever has an oblong slot 28. A slide 29 is provided in this slot 28 and is rotatably fitted on a stud 30 fixed on the slide 6.

For the entry of the parts coupling the handle 18 with the slide 6 into the housing 1 of the machine, a slot 31 is provided. In the example illustrated, a longitudinal slot 31 is provided in the housing 1 for the passage of the stud 30 from the device for adjusting the shavings thicknessing slide 6 arranged externally of the housing 1, through the housing 1 to the slide 6. The adjusting device is preferably covered with a cap 32 on each side of the housing 1.

The method of operation of the adjusting device is as follows:

If the handle 18 is rotated then this rotary movement is transmitted to the angle lever 25, 27, the limb 27 of which carries out an arc-shaped movement. The slide 6 can only carry out a straight movement. The slide piece 29 displaceable in the slot 28 of the limb 27 of the angle lever is provided for surmounting this difficulty, the said sliding piece being rotatably fitted on the stud 30 finally connected with the slide 6.

Figures 7 to 9 show a development of the hand planing machine making it possible to use the hand planing machine also as a stationary trueing machine, if it is rotated by 180°.

For this purpose, the supports 22 of the handles 18 arranged on the one end of the housing 1 are made into feet 33. A supporting device is provided on the other end of the machine which, in the example shown, consists of two folding feet 34, the pivots 35 of which lie in a straight line, or which may also consist of one piece. Each of these folding feet 34 is carried by means of a pivot or stud 36 in a slot 37 of a link piece 38. This link piece 38 is hinged on the housing 1 at 39 in the same or a similar manner as in the case of the folding feet 34. At the outer end of the slot 37 each link piece 38 has a notch 40 in which the stud 36 enters when the folding foot 34 is to be held in the outwardly folded position.

On folding the feet 34 inward, the studs or pivots 36 come out of the notch 40 and move in the slot 37 until the folding foot 34 and the corresponding link piece 38 lie parallel to each other.

Preferably the supporting device is so arranged that it lies lowered in the housing 1. For this purpose, suitable recesses 41 can be provided in the preferably cast housing 1.

It is an advantage of this construction of the portable electrically driven hand planing machine that the parts necessary for the setting up of the machine as a stationary trueing machine are arranged on the machine itself, so that they are always at hand without, on the other hand, their interfering with the service of the portable machine.

A trueing and thicknessing planing machine arises from the portable electrically driven hand planing machine and a stationary frame and base 42 with appurtenances. Figures 10 through 13.

The supporting surface 7, 10 used with the non-stationary use of the hand planing machine comes to rest upward on the connection of the machine with the frame 42 and thus serves as the table of a trueing device over which the work 43 is carried. The pieces 43 and 45 are fed by hand through the machine. They are not worked upon simultaneously, but alternatively, as the work to be done requires. By indicating both work pieces in Figure 10 it is intended to show that the machine can be used as a stationary planing machine as well as a trueing and thickness planing machine.

The part of the external rotor motor 2 carrying the knives 3 and which represents the knife shaft 80 protruding with the portable electrically driven hand planing machine out of the housing 1, is covered with a cover 4 on the non-stationary use of the machine. With the arrangement of the machine in the frame 42, the knife shaft 80 protruding and freed from the cover 4 comes within the frame 42 opposite a table 44 adjustable in height on which is carried the work 45 trued on one side, for machining to thickness.

In order to produce a simple and reliable, but also rapidly detachable connection of the portable hand planing machine with the frame 42, this with stationary use is screwed on to the frame 42 and this preferably by means of thumb screws 46. Two thumb screws 46 are sufficient for this if, as appears advisable, there are furthermore provided on the frame 42 adjusting pins 47 which are adapted to enter into corresponding holes of the portable hand planing machine.

The table 44 adjustable in height and arranged in the frame 42 is adjustable vertically by means of pairs of link pieces 48, so that the desired thickness of the work 45 can be adjusted. The pairs of link pieces 48 are preferably arranged in the form of a parallelogram. One of them is driven through a spur-wheel transmission 49 from a hand-wheel 50. The adjustment of the table 44 by the handwheel 50 through the spur-wheel transmission 49, by which a reduction down takes place, permits of a particularly fine adjustment of the desired thickness.

In known manner there are arranged in front of the knife shaft 80 in the frame 42 a feed roller 51 and behind the knife shaft 80 a pressure roller 52, both being spring-carried in known manner, so that they are pressed by the springs 53 against the work 45. These two rollers 51, 52 are connected through gearing arranged in the frame 42 with the motor 2 of the mounted portable hand planing machine. The driving pulley 64 driven from the motor 2 drives by a spur-wheel 65 fitted on its shaft on to the toothed wheel 66, a spur-wheel 67 fitted on the shaft thereof drives the toothed wheel 68 which drives the two driving wheels 69 and 70 of the feed roller 51 and the pressure roller 52.

The driving pulley 64 is driven from the motor 2 of the mounted hand planing machine. For this purpose, there is provided a device which allows of connecting the rotating part of the motor 2 not in itself projecting out of the housing 1 of the hand planing machine and in the present example the knife shaft 80 formed by the external rotor, in a simple manner, rapidly and easily detachable, with the pulley 64.

In the example shown, the shaft 71 of the motor is rigidly arranged in the housing 1. It carries the stator winding 72. On this shaft is rotatably carried the rotor forming the knife shaft 80. On this rotor is fixed, for example by means of screws 74, a boss 73 which carries a member, in the example shown a wedge-shaped belt pulley 75, driving the gear for the feed roller 51 and the pressure roller 52 of the frame 42. The boss 73 is carried in a bearing 77 fixed by screws 76 on the housing of the hand planing machine. It is therefore simply necessary in order to permit the drive of the feed roller 51 and of the pressure roller 52, after the mounting of the hand planing machine on the frame 42, to screw the wedge belt pulley 75 into the boss or hub 73. To this end, the wedge belt pulley 75 is provided with a threaded spindle 79. Other tools for example drills, circular saws or even a flexible shaft, may be connected on to the boss or hub 73.

Preferably the whole drive is covered with a metal plate casing 78 which is easily fixed on to the frame 42 and can be easily taken off again.

We claim:

1. An electrically driven hand planing machine comprising an external rotor motor forming a cylindrical cutter shaft, a frame forming the supporting surface for the planing machine, a wedge-shaped slide for adjusting the shaving thickness, a shavings discharge conduit, said frame and the walls of the shavings discharge conduit consisting of an integral structure in which said external rotor motor is carried, the shavings discharge conduit being parallel to one of the two wedge-surfaces, a handle arranged at each end of the frame, one of which handles has eccentric connection to the slide, whereby rotary movement of this handle is converted into straight-line movement of the slide, to adjust the latter.

2. An electrically driven planing machine comprising an external rotor motor having cutters secured in the rotor, a housing for the motor and forming the supporting surface for the planing machine when used manually by movement of the machine with the supporting surface as the bottom surface in contact with the surface to be planed, and means on the housing to support the machine in an inverted position whereby the machine is supported in a stationary manner and the work to be planed is moved over the supporting surface.

3. An electrically driven planing machine according to claim 2, in which the means includes a frame to receive the housing, to support the machine in an inverted position.

4. An electrically driven planing machine according to claim 2, in which a handle is provided for the housing and the means on the housing to support the machine in inverted position includes said handle.

5. An electrically driven hand planing machine comprising an external rotor motor forming a cylindrical cutter shaft, a frame forming the supporting surface for the planing machine, a shavings discharge conduit arranged obliquely to said supporting surface, said frame and the walls of the shavings discharge conduit consisting of an integral structure in which said external rotor motor is carried, a wedge-shaped slide for adjusting the shaving thickness, one surface of the wedge-forming surfaces of the slide being slidably arranged and parallel to the adjacent wall of the shavings discharge conduit and the second surface of the wedge-forming surfaces of the slide being arranged to be parallel to the said supporting surfaces in every position of the slide, and a pair of double-armed levers provided and respectively carried on each side of the machine, one of the levers having a slot therein provided with a slide piece fitted rotatably on the other lever.

6. An electrically driven hand planing machine comprising an external rotor motor forming a cylindrical cutter shaft, a frame forming the supporting surface for the planing machine, a shavings discharge conduit arranged obliquely to said supporting surface, said frame and the walls of the shavings discharge conduit consisting of an integral structure in which said external rotor motor is carried, a wedge-shaped slide for adjusting the shaving thickness, one surface of the wedge-forming surfaces of the slide being slidably arranged and parallel to the adjacent wall of the shavings discharge conduit and the second surface of the wedge-forming surfaces of the slide being arranged to be parallel to the said supporting surface in every position of the slide, a handle arranged at one end of the frame as a support, and a supporting device which folds out from the frame at the other end of the machine.

7. An electrically driven hand planing machine comprising an external rotor motor forming a cylindrical cutter shaft, a frame forming the supporting surface for the planing machine, a shavings discharge conduit arranged obliquely to said supporting surface, said frame and the walls of the shavings discharge conduit consisting of an integral structure in which said external rotor motor is carried, a wedge-shaped slide for adjusting the shaving thickness, one surface of the wedge-forming surfaces of the slide being slidably arranged and parallel to the adjacent wall of the shavings discharge conduit and the second surface of the wedge-forming surfaces of the slide being arranged to be parallel to the said supporting surface in every position of the slide, a handle arranged at one end of the frame as a support, and a supporting device which folds out from the frame at the other end of the machine, the supporting device consisting of two folding feet, each of which is carried by means of a pivot by a slotted link piece, the slot of which has at its outer end a notch for the pivot.

8. An electrically driven hand planing machine comprising an external rotor motor forming a cylindrical cutter shaft, a frame forming the supporting surface for the planing machine, a shavings discharge conduit arranged obliquely to said supporting surface, said frame and the walls of the shavings discharge conduit consisting of an integral structure in which said external rotor motor is carried, a wedge-shaped slide for adjusting the shaving thickness, one surface of the wedge-forming surfaces of the slide being slidably arranged and parallel to the adjacent wall of the shavings discharge conduit and the second surface of the wedge-forming surfaces of the slide being arranged to be parallel to the said supporting surface in every position of the slide, a stationary base for the machine, a detachable connection for the frame and the base whereby the supporting surface used in the non-stationary use of the machine projects upward and serves as a trueing device, and the rotor protruding on the opposite side of the machine with the trueing device adjustable in height and on which the work is carried for machining to thickness.

9. An electrically driven hand planing machine comprising an external rotor motor forming a cylindrical cutter shaft, a frame forming the supporting surface for the planing machine, a shavings discharge conduit arranged obliquely to said supporting surface, said frame and the walls of the shavings discharge conduit consisting of an integral structure in which said external rotor motor is carried, a wedge-shaped slide for adjusting the shaving thickness, one surface of the wedge-forming surfaces of the slide being slidably arranged and parallel to the adjacent wall of the shavings discharge conduit and the second surface of the wedge-forming surfaces of the slide being arranged to be parallel to the said supporting surface in every position of the slide, a stationary base and a detachable connection between it and the frame whereby the supporting surface used in the non-stationary use of the machine projects upward and serves as a trueing device, the rotor protruding on the opposite side of the machine with the trueing device adjustable in height and on which the work is carried for machining to thickness, and pairs of link pieces in parallelogram arrangement of which one is manually driven.

10. An electrically driven hand planing machine comprising an external rotor motor forming a cylindrical cutter shaft, a frame forming the supporting surface for the planing machine, a shavings discharge conduit arranged obliquely to said supporting surface, said frame and the walls of the shavings discharge conduit consisting of an integral structure in which said external rotor motor is carried, a wedge-shaped slide for adjusting the shaving thickness, one surface of the wedge-forming surfaces of the slide being slidably arranged and parallel to the adjacent wall of the shavings discharge conduit and the second surface of the wedge forming surfaces of the slide being arranged to be parallel to the said supporting surface in every position of the slide, a stationary base and a detachable connection between it and the frame whereby the supporting surface used in the non-stationary use of the machine projects upward and serves as a trueing device, the rotor protruding on the opposite side of the machine with the trueing device adjustable in height and on which the work is carried for machining to thickness, and a boss fitted on the rotor carried in a bearing fixed on the frame of the machine.

KURT REICH.
GUSTAV WALLISER.

References Cited in the file of this patent

UNITED STATES PATENTS

| Number | Name | Date |
| --- | --- | --- |
| 210,149 | Ross | Nov. 19, 1878 |
| 354,773 | Clement | Dec. 21, 1886 |
| 374,283 | Woods et al. | Dec. 6, 1887 |
| 623,938 | Woods et al. | Apr. 25, 1899 |
| 673,049 | Dupre | Apr. 30, 1901 |
| 851,702 | Spietschka | Apr. 30, 1907 |
| 1,432,860 | Hoy et al. | Oct. 24, 1922 |
| 1,457,492 | Bloodgood | June 5, 1923 |
| 1,549,098 | Magnusson | Aug. 11, 1925 |
| 1,679,562 | Clarke | Aug. 7, 1928 |
| 1,980,056 | Hedeby | Nov. 6, 1934 |